Dec. 12, 1967   W. J. ASHWORTH   3,358,253
SELF-ADJUSTING RELAY
Filed March 31, 1966

INVENTOR
Wm. J. Ashworth

United States Patent Office 3,358,253
Patented Dec. 12, 1967

3,358,253
SELF-ADJUSTING RELAY
William J. Ashworth, Rte. 2,
New Albany, Miss. 38652
Filed Mar. 31, 1966, Ser. No. 539,021
3 Claims. (Cl. 335—197)

This invention pertains to electrical current activated electromagnetic relays and the like and has as its principal object the provision of a novel self adjusting means for relays so that they can be operated throughout a wide current range without changing the physical characteristics of the relay.

This invention is intended for use primarily in electrical motor starting circuits where the use of a relay is more practical than that of the centrifugal switch commonly used in motor starting circuits.

Another object of this invention is to provide a current activated self adjusting relay for use in phase conversion systems where it is desirable or necessary to operate three phase electrical motors from single phase power.

This invention provides a novel means for operating a relay in a motor starting circuit over a wide current range without the necessity of making adjustments or modifying the relay.

As is well known, a motor designed to develop one horsepower will draw a high starting circuit and a lesser running current. A two horsepower motor will require a higher starting and running current than a one horsepower motor and likewise a three horsepower motor will require more starting and running current than a two horsepower motor.

Figure 1:
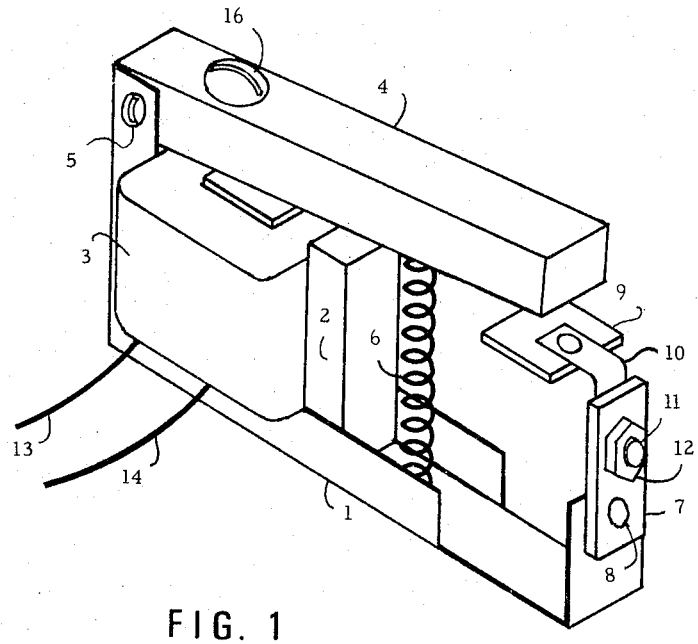
Figure 2:
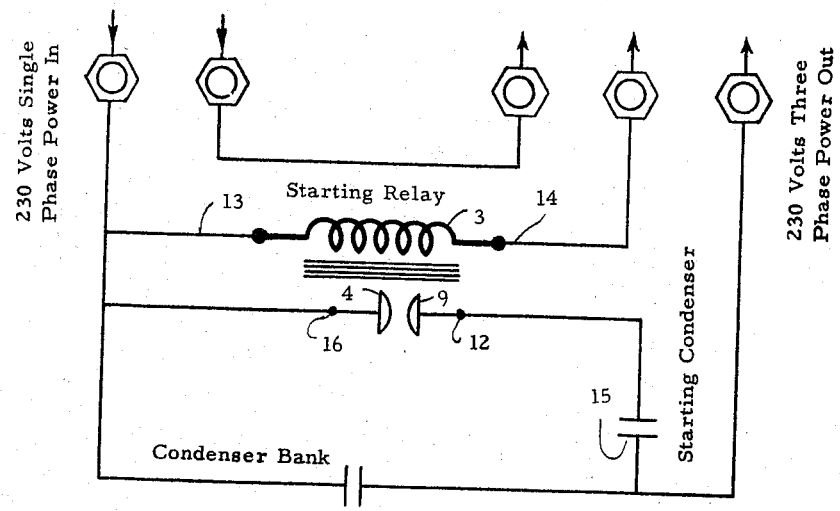

As pointed out, the primary object of this invention is to provide a relay that will function over a wide horsepower range which is self adjusting to the various current requirement of motors over a wide horsepower range. Additional objects and aspects of novelty and utility inherent in the invention will appear from the description and accompanying drawings. FIG. 1 is a perspective view of the invention. FIG. 2 is a schematic of a circuit utilizing the invention.

Referring to FIG. 1, mounting bracket 1 supports E frame 2 on which coil 3 is mounted. Armature 4 is also supported by mounting bracket 1 and held in place by bolt 5. Spring 6 holds armature 4 in a normally open position. Insulator 7 is also fastened to mounting bracket 1 with rivet 8. Switch contact 9 is mounted on flat spring 10 and the flat spring 10 is fastened to insulator 7 with bolt 11 and nut 12.

When an electrical input is connected to coil 3 input wires 13 and 14, an electrical current will flow through the windings of coil 3. This current will induce a magnetic field about E frame 2 causing the soft iron armature 4 to be pulled against switch contact 9. Armature 4 serves as a switch contact as well as a magnetic relay armature.

The invention is so constructed that the same relay will function properly in motor starting circuits of motors of various horsepower ratings.

One such circuit is shown in FIG. 2 where the invention is used in a phase shifting device designed to operate three phase motors from single phase power.

When electrical power is first applied to a motor, it draws a large starting current. This starting current flows through coil 3, causing armature 4 to close against contact 9. This in turn connects the starting capacitor 15 into the motor circuit.

As can be seen from FIG. 1, armature 4 is held in a normally open position by spring 6. Spring 6 is a relatively weak spring and a small current flow will cause armature 4 to be pulled against contact 9. Contact 9 is mounted on flat spring 10. This flat spring 10 serves three purposes. One purpose is to cause armature 4 and contact 9 to remain urged together when an alternating power source is used and eliminates contact chattering.

The second purpose is to provide additional spring loading to armature 4 and comes into play when a large electrical current passes through coil 3. It also serves as an electrical conductor to connect contact 9 to terminal nut 12. Screw 16 is the terminal connection for the armature and contact 4. When a small horsepower motor is started, a small electrical current flows through coil 3. This small current causes armature 4 to be pulled against contact 9 closing the starting circuit. When the motor comes up to speed, the current decreases and spring 6 exerts enough force on armature 4 to push it away from contact 9, breaking the motor starting circuit, returning armature 4 to its normal open position. Armature 4 will remain in this open position until the motor is again started.

If the same relay is used in a starting circuit of a motor with a larger horsepower rating, the initial starting current surge will be greater. This exerts a greater pull on armature 4, causing armature 4 to be depressed against contact 9 with a greater force. This in turn will cause contact 9 to be depressed in a downward position as it rides downward on spring 10. The amount of downward movement is dependent on the current that flows through coil 3.

If only spring 6 were utilized to return armature 4 to its normal open position, for the larger horsepower motors, sufficient tension would not be present to push armature 4 to its open position when the larger horsepower motor reached its running speed because the current would not have dropped off sufficiently. If spring 6 were constructed of a material with sufficient tension to open armature 4 and contact 9 when used with a large horsepower motor, it would have too much tension to allow the contacts to close at all with the starting current of smaller horsepower motors.

Flat spring 10 serves as an auxiliary spring and is brought into action when larger currents are used.

The additional tension exerted by spring 10 produces the necessary force to break contacts 4 and 9 with the running current of larger motors flowing through coil 3. The double action spring system allows the same relay to properly operate motors with a small current requirement as well as motors with a larger current requirement.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

I claim:
1. A self adjusting relay operatable over a wide range of electrical currents, comprising a movable contact-carrying member, electromagnetic means for urging said contact-carrying member into closed circuit position with a second movable contact, a first resilient means urging said contact-carrying member toward its open circuit position, said first resilient means being the sole means for opening said contact-carrying member when said contact-carrying member is urged into the closed circuit position by a predetermined range of electrical currents, and a second resilient means providing a consecutive additional means for urging the said contact-carrying member toward its open circuit position when the said contact-carrying member is urged into engagement with said second movable contact by a range of electrical currents above said predetermined range of electrical currents, said second resilient means operating additionally and consecutively with the said first resilient means to urge the said contact-carrying member toward its open circuit position when the said first resilient means is unable to perform said function alone.

2. A self adjusting relay according to claim 1 in combination with an electric motor, with said relay connected in a line of said electric motor, the said relay providing means for temporarily connecting starting means in the electrical circuit of said electric motor and disconnecting said starting means from the electrical circuit of said electric motor.

3. A self adjusting relay according to claim 1 in combination with an electrical phase conversion system with said relay connected in a line of said phase conversion system, said relay providing means for temporarily connecting a starting capacitor in a line of said phase conversion system and disconnecting said starting capacitor from said line of said phase conversion system.

References Cited

UNITED STATES PATENTS 1,807,815  6/1931  White _____ 335—193
2,184,564  5/1965  Ryckman et al. _____ 335—187

BERNARD A. GILHEANY, *Primary Examiner.*

J. J. BAKER, R. N. ENVALL, *Assistant Examiners.*